Patented Sept. 26, 1950

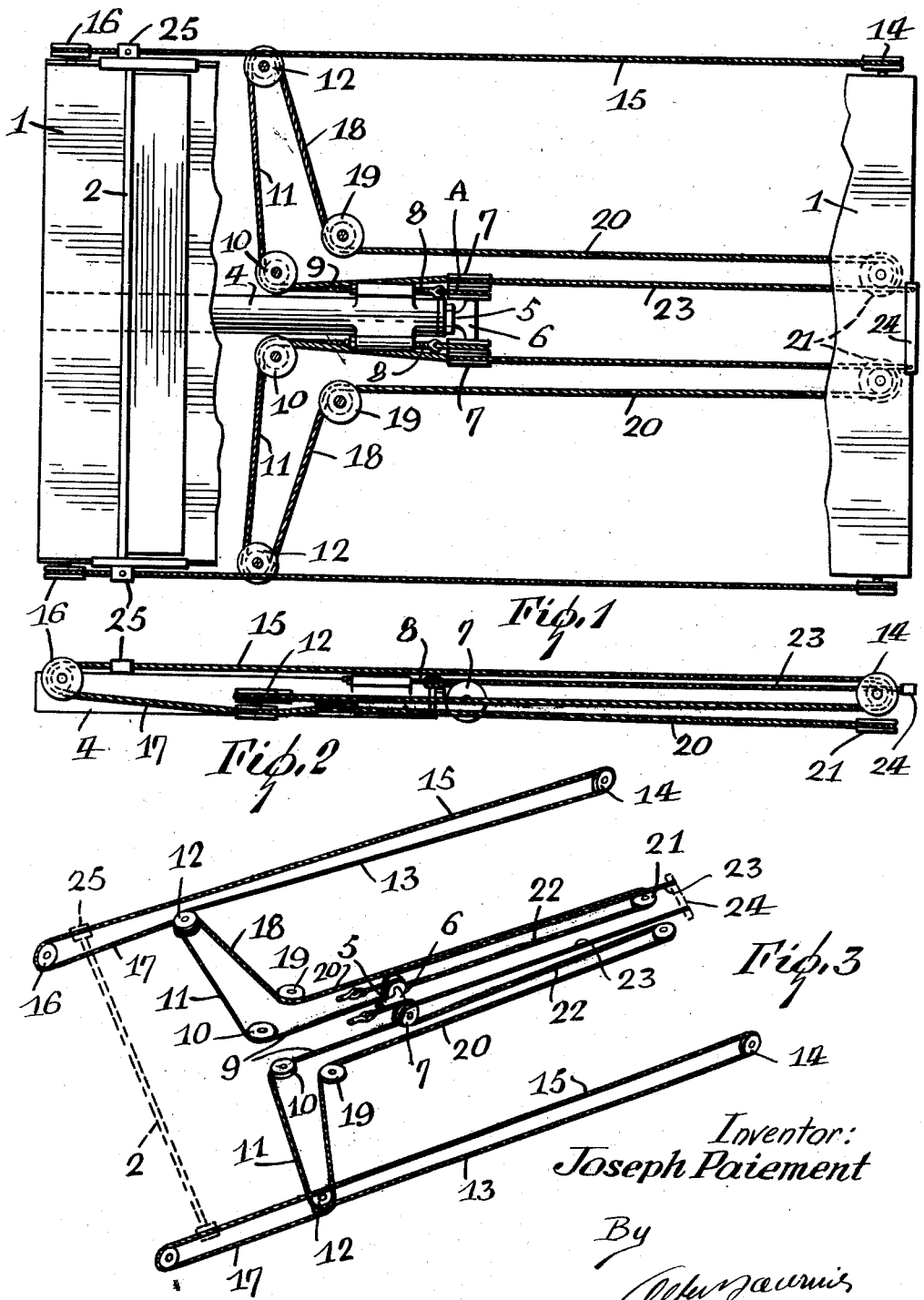

2,523,916

UNITED STATES PATENT OFFICE 2,523,916

LOADING AND UNLOADING MECHANISM FOR VEHICLES

Joseph Paiement, Pointe Claire, Quebec, Canada

Application October 23, 1948, Serial No. 56,105
In Canada November 1, 1947

2 Claims. (Cl. 214—83.22)

The present invention pertains to a novel loading and unloading mechanism for trucks and similar vehicles embodying a transverse and vertical wall slidable along the floor of the vehicle as disclosed generally in my American Patents No. 2,218,121 of October 15, 1940 and No. 2,318,886 of May 11, 1943.

The later patent discloses a cable system actuated by a piston rod for moving a wall along the floor of the vehicle. The patented system involves a double pulley which requires the piston rod to travel half the distance traversed by the cable and the wall attached thereto.

The principal object of the present invention is to provide a similar system in which the relative travel of the piston rod is reduced still further. As a result, the length of the piston rod and the cylinder for actuating the same are correspondingly reduced.

As in the prior patent, a dual cable system is employed, consisting of similar units at opposite sides of the longitudinal center of the vehicle and actuated by a common piston rod. The cable of each unit passes around a double pulley carried by the piston rod and eventually around another double pulley at a substantial distance from the first, after passing around a number of intermediate pulleys. The cable has both ends appropriately anchored to fixed points on the vehicle, and the movement of the double pulley carried by the piston rod causes a shift of the intermediate parts of the cable in one direction or the other. The sliding wall is fastened to one of these shifting parts and accordingly is displaced in one direction or the other according to the movement of the piston rod. In a loaded vehicle, the wall lies forward of the load and discharges the load by being moved rearwardly by the cable.

The invention is fully disclosed by way of example in the following description and in the accompanying drawings in which:

Figure 1 is an end view of the device;

Figure 2 is a side elevation; and

Figure 3 is a perspective view of the cable system.

Reference to these views will now be made by use of like characters which are employed to designate corresponding parts throughout.

In Figure 1 is illustrated a portion of the floor 1 of a transport vehicle such as a motor truck or a railway car. On the floor is slidably mounted a transverse and vertical, load-displacing wall 2. The construction and support of the wall, as well as other details not involved directly in the invention, are already known in the art by way of the aforementioned patents.

The frame or the floor supports a cylinder 4 lying substantially in the longitudinal central plane and disposed preferably beneath the floor. From the cylinder extends a piston rod 5 directed preferably toward the rear end of the vehicle, and the rod in turn carries a crosshead 6. Double pulleys 7 are carried by the ends of the crosshead, lying with their axes horizontal, for a purpose that will presently be described. A pair of brackets or anchors 8 are carried by opposite sides of the cylinder 4 and respectively adjacent to the pulleys 7, each retaining an end of a cable A, there being two such cables.

Since the supports and paths of both cables are alike, only one system will be described in detail. The pulleys embodied in the system will be identified as horizontal or vertical, according to the planes of their ends. The path of each cable may be followed according to the numerical sequence of its supporting pulleys and its identified laps.

Each cable A is first passed halfway around one of the grooves of the corresponding double pulley 7 and then directed at 9 over a horizontal pulley 10 mounted close to the cylinder 4. The cable is thereby given an approximately 90° turn and is directed at 11 to pass nearly quarterway around another horizontal pulley 12 near the longitudinal edge of the floor. From the pulley 12 the cable extends at 13 along the edge of the floor and halfway around a vertical pulley 14 at the rear end of the floor. Then the cable is extended forwardly and longitudinally at 15 around another vertical pulley 16 at the forward end of the floor and is carried at 17 into the remaining groove of the double pulley 12. From the pulley 12 the cable continues at 18 around another horizontal pulley 19 mounted close to the cylinder 4. The cable continues at 20 in the rearward longitudinal direction and around a horizontal pulley 21 at the rear edge of the floor and beneath the floor. From the pulley 21 the cable is returned forwardly at 22 around the remaining groove of the double pulley 7 and then rearwardly again at 23 to have its remaining end finally secured to an anchor piece 24 at the rear end of the floor or frame.

The lap 15 is secured to the adjacent edge of the door 2 by a suitable fastening 25, as shown more clearly in Figures 1 and 3.

In the operation of the device, let it be assumed that the wall 2 is disposed at the forward end of the floor and that the piston rod 5 is withdrawn as far as possible into the cylinder 4. It is obvious, however, that the system may be reversed, with the anchor piece 24 disposed forwardly and the piston rod extending through the forward end of the cylinder. In the arrangement shown, the piston rod on being advanced obviously moves the crosshead 6 and pulleys 7 rearwardly. Since each cable is tied at 8, the lap 7 moves rearward, the lap 11 inward, the lap 13 forward, the lap 15 rearward, the lap 17 forward, the lap 18 outward, the lap 20 forward, the lap 22 rearward, shortening the anchored lap 23. The wall 2 attached to the laps 15 as already indicated, moves rearwardly with these laps and discharges the load. To return the wall 2 to its forward position, the piston rod 5 is drawn into the cylinder 4, reversing the previously described movement of the cables. This movement may be used for pulling a load upon the vehicle.

Although a specific embodiment of the invention has been illustrated and described, it will be understood that various alterations in the details of construction may be made without departing from the scope of the invention as indicated by the appended claims.

What I claim as my invention is:

1. A loading and unloading device comprising, in combination with the floor of a vehicle, a transverse wall mounted on said floor to move lengthwise thereof, a pulley carrier mounted for movement lengthwise of said floor, means for moving said carrier, a double pulley carried by said carrier, another double pulley carried by the vehicle, and spaced laterally from the first pulley, said points being disposed at opposite sides of the first double pulley and spaced apart lengthwise of said floor, a plurality of single pulleys carried by the vehicle and spaced apart lengthwise of the vehicle at opposite sides of said double pulleys, a cable having its ends attached to two fixed points on the vehicle and also attached to said wall, said cable extending from one of said points singly around the first double pulley, around a single pulley at one side of the first double pulley, singly around the second double pulley to a single pulley at the other side of the first double pulley, again around the second pulley to a single pulley at said other side, and again around the first double pulley to the remaining fixed point.

2. A loading and unloading device comprising, in combination with the floor of a vehicle, a transverse wall mounted on said floor to move lengthwise thereof, a pulley carrier mounted for movement lengthwise of said floor, means for moving said carrier, a double pulley carried by said carrier, another double pulley carried by the vehicle, and spaced laterally from the first pulley, said points being disposed at opposite sides of the first double pulley and spaced apart lengthwise of said floor, a pair of single pulleys between said double pulleys and at one side of the first double pulley, two single pulleys spaced lengthwise apart at opposite sides of the second double pulley, another single pulley at the other side of the first double pulley, a cable having its ends attached to two fixed points on the vehicle and also attached to said wall, said cable extending from one of said points singly around the first double pulley, around one of the pulleys of said pair and singly around the second double pulley, around said two single pulleys and again around the second double pulley, around the remaining single pulley of said pair, and again around the first double pulley to the remaining fixed point.

JOSEPH PAIEMENT.

REFERENCES CITED

The following references are of record in the file of this patent:

UNITED STATES PATENTS

| Number | Name | Date |
| --- | --- | --- |
| 2,301,641 | Pendleton | Nov. 10, 1942 |
| 2,318,886 | Paiement | May 11, 1943 |
| 2,408,284 | Anthony | Sept. 24, 1946 |
| 2,481,994 | Ginder | Sept. 13, 1949 |